Oct. 5, 1954     T. ANDERSEN     2,690,849

DIGGING AND LOADING ATTACHMENT FOR VEHICLES

Filed Jan. 9, 1951

INVENTOR.
Tengel Andersen
BY
Kenway, Jenney, Witter & Hildreth
Attys.

Patented Oct. 5, 1954

2,690,849

UNITED STATES PATENT OFFICE 2,690,849

DIGGING AND LOADING ATTACHMENT FOR VEHICLES

Tengel Andersen, Cape May, N. J.

Application January 9, 1951, Serial No. 205,185

4 Claims. (Cl. 214—140)

This invention relates to digging and loading attachments for vehicles and more particularly to double arm loaders adapted for digging at both ends of the vehicle. In one aspect this invention relates to improvements over the digging and loading attachment described and claimed in my co-pending application Serial No. 34,718, filed June 23, 1948, now United States Patent No. 2,537,010, dated January 9, 1951.

The objects of this invention include the provision of improved dumping mechanism in the context of my above-mentioned earlier application, the provision of "push-tilting" mechanism, the provision of mechanism for positioning the digging bucket for carrying a load, and the provision of indexing apparatus for enabling the operator to position the bucket for digging while the bucket is still overhead.

In the accomplishment of these objects, I employ a bucket and push arms essentially the same as described in my above-mentioned earlier application, but with these, I provide bucket positioning arms mounted on a pivot linkage arrangement which enables me to accomplish all four aspects of my above-mentioned objects.

These and other objects and features of my invention will best be understood and appreciated from a detailed description of a preferred embodiment thereof, selected for purposes of illustration and shown in the accompanying drawings, in which.

Figure 1:
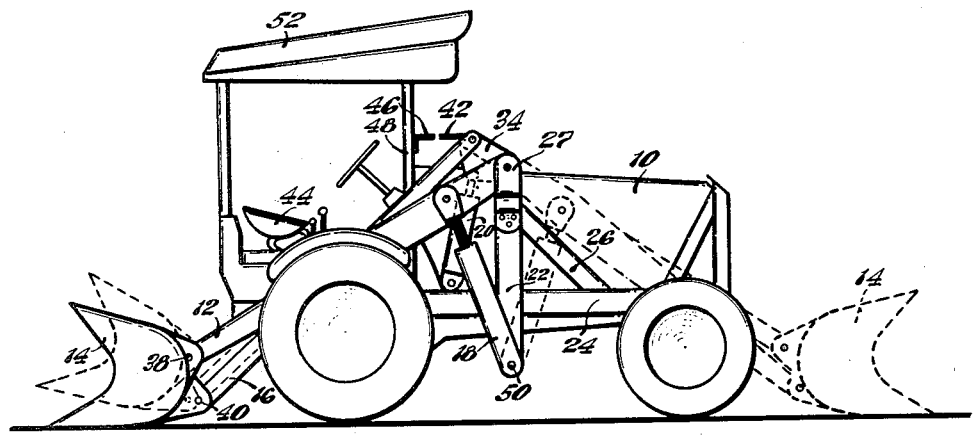
Fig. 1 is a view in side elevation of the digging and loading attachment of my invention mounted on a conventional wheel type tractor for rear end digging, and showing in dotted lines the bucket position for front end digging.

The preferred embodiment of my invention herein shown is represented as being mounted on a conventional wheel type tractor 10. In its general organization, the digging and loading attachment of my invention includes push-arms 12 pivotally mounted on the tractor, a digging bucket 14 pivotally mounted on the ends of arms 12, bucket positioning arms 16, and hydraulic jacks 18 and 20 controlling the position of arms 12 and 16 respectively.

Figure 2:
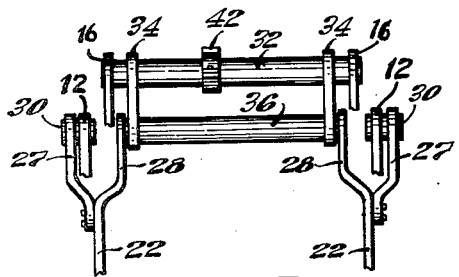
Fig. 2 is a view in front elevation of the arm suspension and linkage arrangement.

The arms 12 and 16 are mounted one on each side of the tractor by means of main braces 22 secured to the main frame 24 of the tractor. Braces 22 are buttressed by forwardly slanting braces 26 likewise secured to the frame 24. With particular reference to Fig. 2 it will be seen that the upper part of braces 22 is formed in a Y shape having outer arms 27 secured to braces 22 and inner arms 28 extending inwardly and upwardly from the main body of braces 22. The push arms 12 are pivotally mounted on a short shaft 30 which is secured to outer arms 27. The bucket positioning arms 16 are pivotally mounted on a shaft 32 which extends across the top of the tractor. The shaft 32, however, is not fixed but is mounted for arcuate movement about the pivot axis of the shaft 30 by means of link plates 34 which are pivotally mounted on a fixed shaft 36 which is coaxial with shaft 30 and is mounted on inner brace arms 28. The shaft extends across the top of the tractor 10 as does shaft 32.

As may be seen in Fig. 1, the digging bucket 14 is pivotally connected to push arms 12 at 38, and to positioning arms 16 at 40.

Hydraulic jacks 18 are employed (one on each side of the tractor) to control the movement of arms 12, with the jacks 18 being pivotally cross-connected between a point on the frame 24 which is substantially directly below the pivot axis of arms 12, and a point on arms 12 which is intermediate between the bucket 14 and the pivot axis of the said arm 12. Jacks 20 are employed, one on each side of the tractor, to control the bucket positioning arms 16, with the jacks 20 being pivotally cross-connected between a point on the frame 14 and an intermediate point on link plates 34. Hose connections and other hydraulic mechanisms for the jacks 18 and 20 are not shown in the drawings since they are manifestly conventional and their construction is well known to those skilled in the art.

The embodiment herein shown incorporates the two arm bucket supporting arrangement described and claimed in my co-pending application Serial No. 34,718, and therefore, as the pistons of lifting jacks 18 are extended to raise arms 12 from the digging position, the bucket 14 automatically rotates toward an upright position. Thereafter, as the bucket 14 passes overhead, it commences to rotate back relative to the arms 12 and thereby keeps in a substantially upright position. In this embodiment, however, the bucket 14 is dumped by extending the pistons of jacks 20 which in turn rock the link plates 34 and move the arms 16 to pivot the bucket 14 about its connecting point 40 to arms 12. The dumping operation is more clearly illustrated in Fig. 4.

The embodiment herein shown also includes an operation known as "push-tilting" which is likewise accomplished by operation of jacks 20. When the bucket 14 is in the digging position shown in Fig. 1, with the arms 12 and 16 in crossed relation, the pistons of jacks 20 may be retracted to lower links 34 and thereby extend arms 16 so as to rock the bucket rearwardly and upwardly as is shown in dotted lines. Push-tilting in this manner is highly desirable in breaking out crusted ground and also in obtaining a full bucket load of loose material.

In order to accentuate push-tilting for rear end digging, it will be noted that the pivot axis for arms 16 is substantially higher than the pivot axis for arms 12 when the bucket 14 is in the digging position. By being so positioned, the links 34 are adapted to carry the pivot point of arms 16 through a greater arc prior to reaching the neutral position of alignment with arms 16, and therefore greater push-tilting may be accomplished. It will be further noted that since the arms are crossed in the digging position, extending arms 16 for push-tilting is accomplished by moving links 34 downward. This downward motion is opposite to the motion required for dumping and results in positioning the bucket 14 properly for passage overhead. If links 34 were not so lowered, the bucket 14 would be more apt to spill material forwardly as it passed overhead.

Thus, the angle of the bucket 14 is controlled by jacks 20 acting on links 34, and I utilize this fact in providing means for assisting the operator to position the bucket 14. This is done by securing an indicator 42 to shaft 32 which is directly in front of the operator as he sits in the tractor driver's seat 44. A second indicator 46 is secured to the tractor housing 48, and indicator 42 is arranged so that it is horizontal and parallel to indicator 46 when the bucket is in digging position. Thus by operating jack 20 to bring indicator 42 to the horizontal position in registration with indicator 46, the operator can readily position the bucket 14 for digging without waiting to lower the same to the ground and position it by observation.

Figure 4:
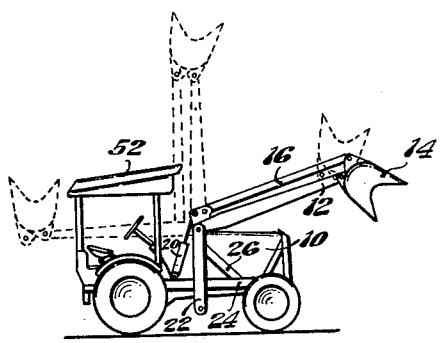
Fig. 4 is a view in side elevation on a reduced scale showing the digging and loading attachment in various positions.
Figure 3:
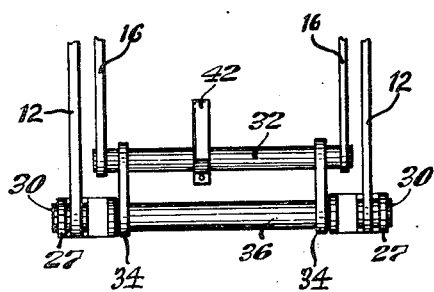
Fig. 3 is a plan view of the arm suspension and linkage arrangement.

In Fig. 4 the rear "carry" position is illustrated in dotted lines. This is an important feature of my invention and serves to make a wheel type tractor far more useful than it has been with previous loaders. By providing added stability, and traction for the rear wheel while in the "carry" position, tractors employing my digging and loading attachment are now suitable for operations where it was necessary to employ a crawler type tractor previously. It will be seen that operation of jacks 20 to lower links 34 and extend arms 16 in a manner similar to that described above for push-tilting, also serves to position the bucket 14 for carrying.

Another feature of my invention in combination with those already described is that the pivot axis of the push arms 12 is high and the thrust point 50 of the lifting jacks 18 is low and substantially directly beneath the pivot axis of the push arms 12. Thus thrust point need not be exactly beneath the said pivot axis but it should be close enough thereto to permit passage of the bucket 14 by momentum through the neutral, vertical position overhead. The fact that the pivot axis of arms 12 is high is important in enabling me to employ shorter arms than were hitherto possible for overhead loaders. In overhead loaders, the critical factor of arm length is head clearance for the operator or for a protective roof 52. If the pivot point is low, long arms are required for head clearance thus providing a poor leverage combination and positioning the center of gravity of the load too far to the rear. With my arrangement I employ short arms and bring the center of gravity of the load close in to the rear wheels, while at the same time providing ample clearance for the bucket as it passes over the operator's head.

The jacks 18 which lift the arms and bucket overhead are single acting jacks, and accomplish their purpose simply by extending their pistons until the arms 12 are substantially vertical. At this point the arms and bucket pass through the vertical by momentum and lowering on the opposite side is accomplished merely by releasing fluid in jacks 18. By employing single acting jacks in this important lifting phase of my apparatus I greatly simplify the hydraulic system. Jacks 20, however, are double acting jacks as shown, because it is preferable in this euipment to have a more positive control of the angle of the bucket than would be feasible with single acting jacks in place of jacks 20.

The operation of my invention is essentially as follows. The bucket 14 is lowered into digging position in the rear by lowering arms 12 and simultaneously bringing indicators 42 and 46 into registration. The tractor 10 is then backed into the material being dug and loaded. Once the bucket 14 is firmly lodged in the said material, jacks 20 are operated to push-tilt the bucket 14. If the terrain is rough and trucks or the like cannot take position near the tractor, the load may be lifted to the carry position to provide added traction while the tractor advances with the load. Under normal conditions, however, a run of only a few feet is feasible and the load is lifted over while the tractor advances without stopping at the carry position. The bucket passes smoothly over the center point at which time the operator shifts his control and lowers by releasing fluid in jack 18. When in position, the bucket 14 is dumped by extending the piston of jacks 20 as described above.

It should be noted that this arrangement provides great flexibility in placing the load in a truck. For instance if the operator desires to put the load on the far side of a truck, he can dump while the bucket is still in forward motion and more or less catapult the load to the far side of the truck. Other variations in loading techniques possible with this equipment will be evident to those skilled in the art and still further techniques will be developed.

The dimensions of arms 12 and 16 and the exact location of their pivot points at each end are critical in the arrangement shown. If it is desired to adapt the attachment for digging at both ends, it is obvious that there must be no position through which the arms cannot pass with the pivot points of the bucket in alignment with the arms. My earlier application Serial No. 34,718 shows the pivot points for the push arms and the positioning arms as being in the same horizontal plane and the pivot points of the said arms on the digging bucket being in a plane normal to the axis of the bucket. However, in the preferred embodiment herein shown the pivot axis of arms 16 is in a substantially higher plane than that of arms 12, a fact which necessitates offsetting the pivot points on the bucket a comparable amount from the plane which is normal to the axis of the bucket. The reason for this change was to accentuate the push-tilt operation for rear end digging, as was explained above.

Since certain minor variations of my invention will be apparent to those skilled in the art, it is not intended to confine the invention to the precise form herein shown, but rather to limit it in terms of the appended claims.

Having thus disclosed and described a preferred embodiment of my invention, what I claim as new and desire to secure by Letters Patent of the United States is:

1. A digging and loading attachment for vehicles comprising a pair of push arms, means supporting said push arms on said vehicle for pivotal motion about an elevated transverse pivot axis, a hydraulic lifting jack positioned to thrust from a point on said vehicle substantially directly below the said pivot axis of each of said push arms against an intermediate point on said push arms; said push arm supporting means being adapted to permit said arms to pass through the vertical freely to each end of said vehicle, and said lifting jacks being positioned relative to said push arms and said push arm supporting means to pass clear of said push arms and supporting means when said push arms pass through the vertical; said push arms being spaced apart and defining an open area between them on their pivot axis, a linkage frame mounted on said vehicle in said open area between said push arms for pivotal motion about the said pivot axis of said push arms, positioning arms pivotally connected to said linkage frame and lying between said linkage frame and said push arms whereby to pass freely through the vertical and to each end of the vehicle laterally outward of said linkage frame and inward from said push arms and push arm supporting means; a bucket pivotally mounted on the ends both of said push arms and said positioning arms; and means for controlling the angular position of said bucket including a hydraulic jack connected between said vehicle and said linkage frame adapted to pivot said frame and hence said bucket by actuation of said positioning arms.

2. The digging and loading attachment defined in claim 1 further characterized by index mechanism connected to said linkage frame and a cooperating index mechanism connected to said vehicle positioned to be in registration when said bucket is in the digging position.

3. The digging and loading attachment defined in claim 1 further characterized by said push arms being in crossed relationship with said positioning arms when the bucket is in digging position and in uncrossed relationship when the bucket is in dumping position.

4. The digging and loading attachment defined in claim 3 further characterized by the connection between said positioning arms and said linkage frame being substantially higher than the pivot axis of said push arms.

References Cited in the file of this patent

UNITED STATES PATENTS

| Number | Name | Date |
|---|---|---|
| 2,348,899 | Guignard et al. | May 16, 1944 |
| 2,412,323 | Conrad | Dec. 10, 1946 |
| 2,449,212 | Fraga | Sept. 14, 1948 |
| 2,463,675 | Beyerstedt | Mar. 8, 1949 |
| 2,517,582 | Lull | Aug. 8, 1950 |
| 2,537,010 | Andersen | Jan. 9, 1951 |